Feb. 15, 1966             I. L. JOY           3,234,777
APPARATUS FOR ELECTRICALLY MEASURING WHEEL
LOADS APPLIED TO RAILWAY TRACK
Filed Feb. 7, 1963                         4 Sheets-Sheet 1
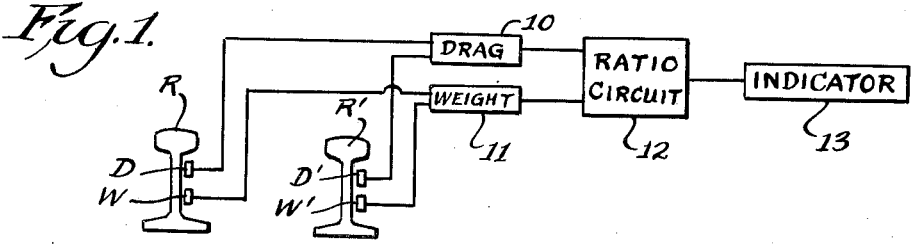
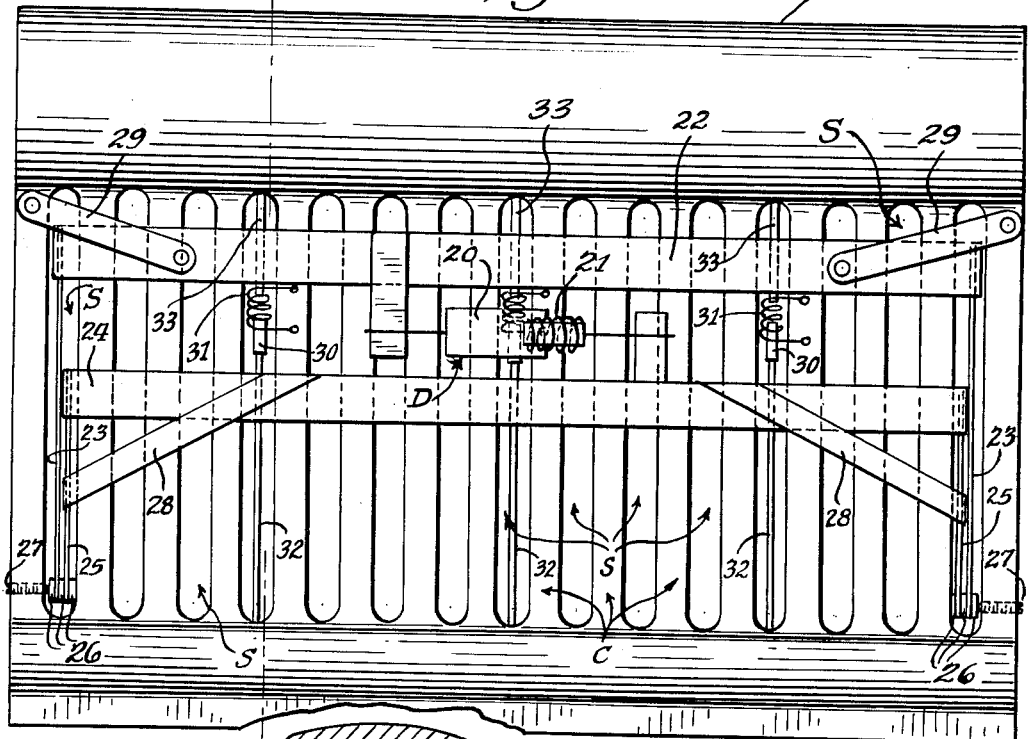
Inventor
Ivan L. Joy
By Mann, Brown & McWilliams
Attys.

Feb. 15, 1966  
I. L. JOY  
3,234,777  
APPARATUS FOR ELECTRICALLY MEASURING WHEEL  
LOADS APPLIED TO RAILWAY TRACK  
Filed Feb. 7, 1963  
4 Sheets-Sheet 2

Fig. 3.

Inventor  
Ivan L. Joy.  
By  
Mann, Brown & McWilliams  
Attys.

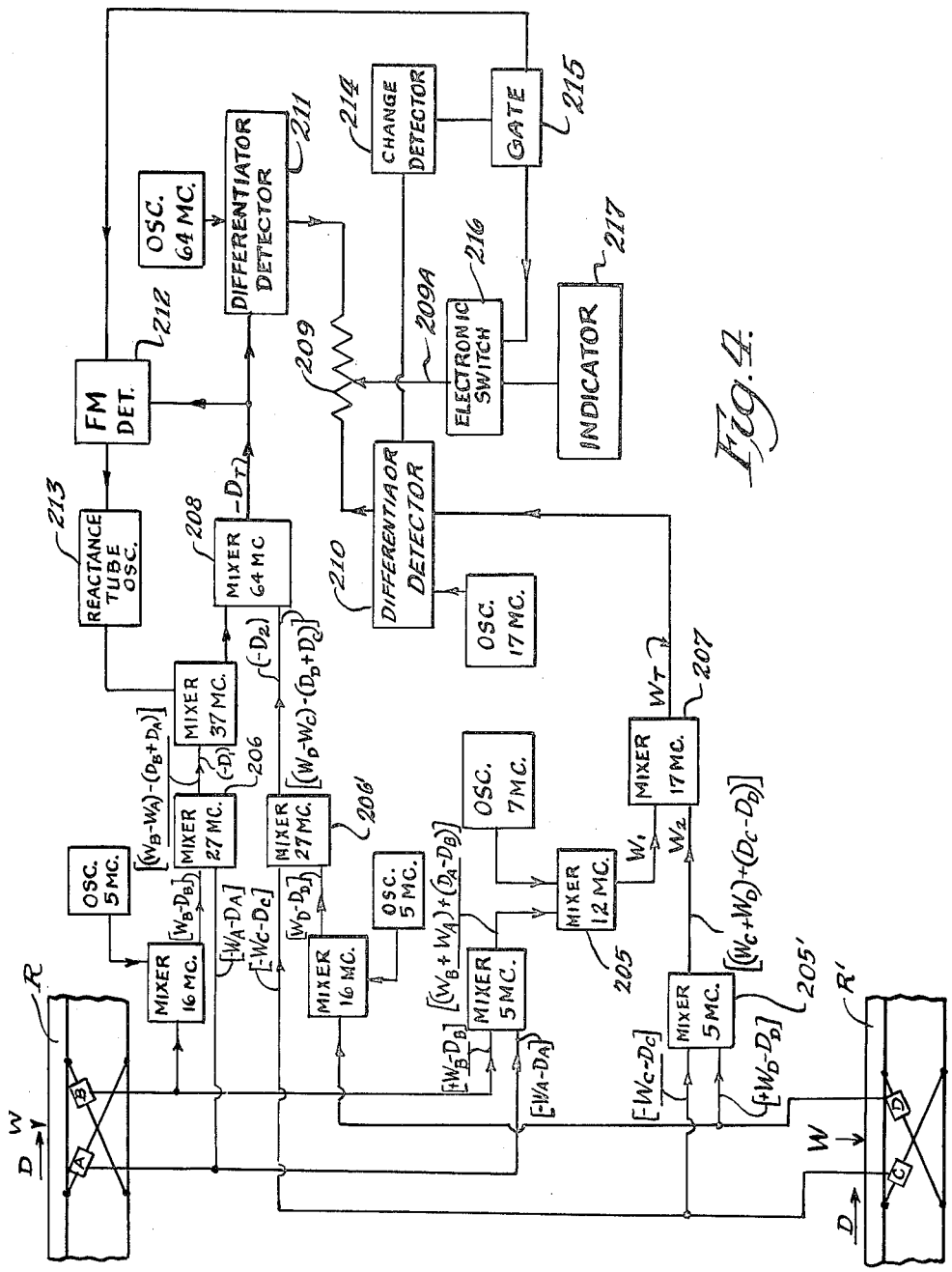

Feb. 15, 1966  I. L. JOY  3,234,777
APPARATUS FOR ELECTRICALLY MEASURING WHEEL
LOADS APPLIED TO RAILWAY TRACK
Filed Feb. 7, 1963  4 Sheets-Sheet 4
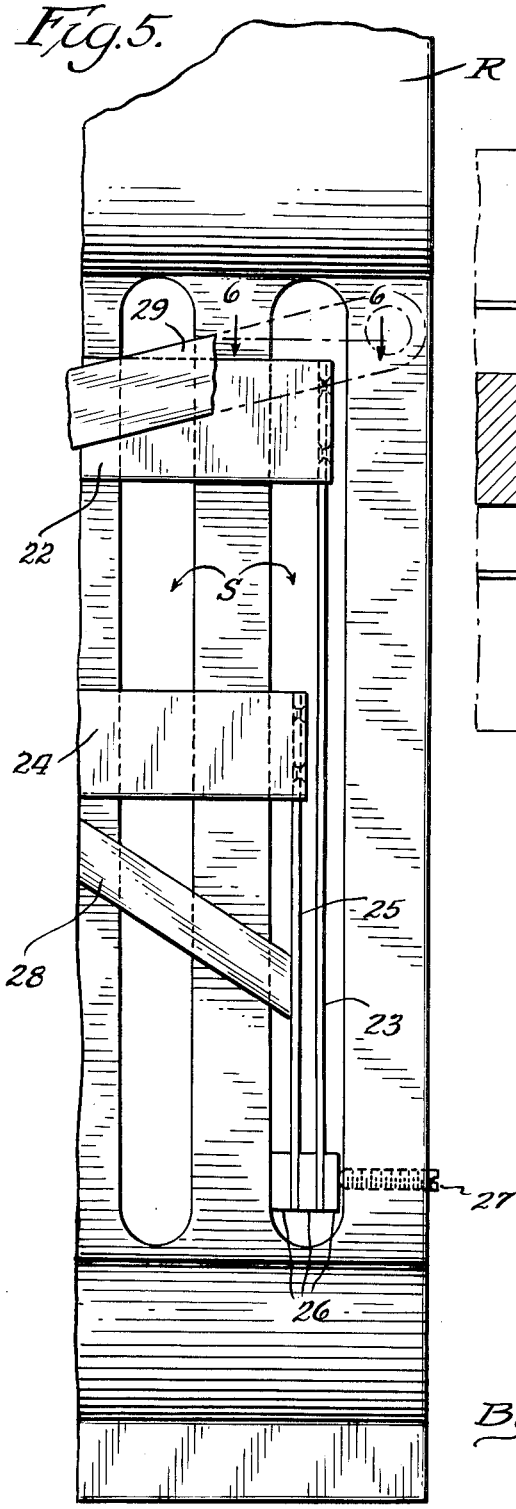
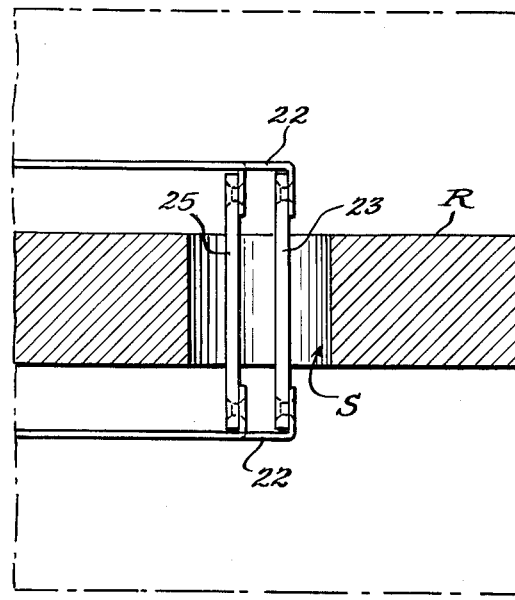
Inventor
Ivan L. Joy.
By
Mann, Brown & McWilliams
Attys.

United States Patent Office 3,234,777
Patented Feb. 15, 1966

3,234,777
APPARATUS FOR ELECTRICALLY MEASURING WHEEL LOADS APPLIED TO RAILWAY TRACK
Ivan L. Joy, 1616 W. 29th St., Topeka, Kans.
Filed Feb. 7, 1963, Ser. No. 256,964
16 Claims. (Cl. 73—9)

This invention relates to electronic measurement of minute strain conditions such as occur in rigid bodies under momentary loads.

More particularly the invention is concerned with electronic measurement of the metal distortion experienced by a rail section being traversed by rolling car wheels and for illustrative purposes the application of the invention to the determination of journal friction is considered herein.

The measurement of journal friction is determined by the ratio of the drag force to the weight force applied to the rail. To determine this ratio, the drag force and weight force must be isolated from forces that are present. While the weight force runs on the order of 6000 pounds per wheel, the drag force may be on the order of 50 pounds and equipment must be provided for sensitive and stable response to instantaneous loads of this nature.

The principal object of the invention is the provision of an electronic strain measuring system that is sensitive and stable; that is capable of high speed operation; that eliminates drifting and related problems such as are occasioned by temperature effects and other types of circuit disturbances; and that is linear in its response to allow for cancellation of irrelevant forces such as are occasioned by unequal wheel diameters in the case of the wheel pairs for railroad rolling stock.

In the railway journal friction detection application, sense units are mounted to special rail section inserts in order to respond selectively to the forces that are to be measured.

Accordingly, another object of the invention is the provision of a novel arrangement for mounting sense units to rail sections to enable the sense units to isolate and respond to drag and weight forces separately.

The forces occasioned by a moving railway car are large and variable and require extremely sensitive and stable sense equipment suitable for repetitive actuation without loss of stability.

Accordingly, another object of the invention is the provision of a frequency responsive electronic system for actuation by the rail mounted switch units.

Other objects and advantages will become apparent during the course of the following description.

In the accompanying drawings forming a part of this specification and in which like numerals are employed to designate like parts throughout the same:

FIG. 1 is a generalized diagram of the invention as applied to track rail for measurement of journal friction;

FIG. 2 is a side elevational view of a rail section equipped with sense units for detecting drag and weight forces applied thereto;

FIG. 2A is a transverse sectional view through the rail and is taken as indicated by the line 2A—2A of FIG. 2;

FIG. 3 is a detailed circuit diagram illustrating one embodiment of the invention as applied to track rail;

FIG. 4 is a detailed circuit diagram illustrating an alternative embodiment of the invention as applied to track rail;

FIG. 5 is an enlarged fragmentary side elevational view of the right end of the rail section depicted in FIG. 2; and FIG. 6 is a sectional view taken on the line 6—6 of FIG. 5.

*General description of FIG. 1*

In FIG. 1, there is illustrated an embodiment of the invention as applied to track rails R and R' for measuring the rolling characteristics of railway cars. Each of rails R and R' is equipped with sense elements D and W, and D' and W', respectively, for measuring the lineal drag force and vertical weight force applied by a railway car wheel as it rolls along.

Since railway car wheels are connected by a solid axle to function as a unitary wheel pair, the drag sense elements D and D' for the two rails may be connected to a common drag measuring circuit 10 to provide a composite drag measurement representative of the combined drag effect exerted by each wheel pair. Cumulatively connected bidirectional drag sense elements allow for cancellation of undesired forces such as are commonly encountered where the wheels of each pair are of unequal diameter. Correspondingly, the weight sense elements W and W' are cumulatively connected into a common weight measuring circuit 11. Each of these circuits may include an indicator arrangement for directly measuring drag or weight. Such indicators may show the force associated with each wheel as well as the composite force.

The drag and weight measuring circuits are in turn connected to a ratio circuit 12 for developing a signal representative of the drag-to-weight ratio of each wheel pair. Since the drag force exerted by a rolling wheel is dependent upon the friction coefficient existing between its rotating journal and the journal bearing and upon the weight load acting between the journal and its bearing, the ratio of drag to weight gives a true measure of the efficiency of the bearing and hence of the likelihood of developing a hot box.

An indicator 13 is connected to the ratio circuit 12 to indicate the measured drag-to-weight ratios. It may be confined to producing an indication only when drag-to-weight ratios are excessively high.

Each sense unit is mounted to a rail section to respond selectively to certain distortion effects that occur due to the applied weight and drag forces. The variable element of the sense unit may be a resistor, capacitor, or inductor and in the preferred embodiment, the sense unit is a transistor oscillator containing and controlled by an element that varies in a fashion that provides linear correlation between oscillator frequency and distortion displacement. A plate type condenser can be employed with suitable tie links connected to spaced points on the rail section. Similarly a plug type tuning coil having its coil wound progressively more closely has been employed to drive the transistor oscillator through a linear frequency range of 250 kc. corresponding to 0.005 inch displacement.

Rail distortion due to wheel loading involves shear strain in the lengthwise direction of the rail due to drag stresses, compression strain due to vertical weight stresses, bending or flexing of the rail head due to localized application of the weight load, and shear strains accompanying and proportional to compression strains in accordance with Poisson's ratio. Accordingly, special provision is made in the attachment of the sense units to the rail section to enable each unit to respond to the particular strain movement which it is to measure. In FIG. 2, a slotted rail section R is shown equipped with facilities to measure drag forces and weight forces separately. The rail section R is 10" long and is provided with 15 vertical slots S each of ¼" width and separated by metal columns C of ⅜" width.

The drag sense element designated generally at D is illustrated as including a slug tuned inductance having a cup 20 that receives a wire wound core 21 to vary the inductance effect in accordance with relative endwise displacement therebetween. The cup 20 is supported from a lengthwise carrier bar 22 that is attached between lengthwise spaced upper ends of a set of vertical reeds 23 that are located in the endmost slots S, with the lower end of each reed within the bottom of its slot. Correspondingly the core 21 is supported from a lengthwise carrier bar 24 that is attached between lengthwise spaced upper ends of another set of vertical reeds 25. The reeds 25 are also located in the endmost slots and are anchored within the bottom thereof. The bottom anchorages for the reeds 23 and 25 comprise a set of spacers 26 interdigitated with the reed ends and clamped tightly against a side face of the slot by means of set screws 27. Each of the reeds 23 is easily deflected lengthwise of the rail while each of the reeds 25 is normally maintained vertical by means of braces 28 to accommodate relative movement between the sense elements in accordance with lengthwise distortion of the rail head. While the lengthwise spacing afforded by the spacers 26 between the adjacent reeds 23 and 25 determines the maximum relative lengthwise movement therebetween, the required movements due to rail distortion are readily accommodated.

The reeds 23 are connected to the rail by Poisson compensator links 29 so that drag induced shear strains shift the carrier 22 while weight induced shear strains do not. The angle of the compensator links 29 relative to the reeds 23 is determined by Poisson's ratio for the material of the rail. The displacement of the rail head and of links 29 under weight loads are accommodated by slight horizontal compression of bar 22 and vertical compression of reeds 23 also accompanied by transverse deflection of these elements. Such vertical and lateral movements do not affect the coil 21 and 20.

The weight sense element as best shown at W in FIG. 2A may utilize a core 30 and coil 31 attached to lower and upper support rods 32 and 33, respectively, fixed within one or more of the rail slots in symmetrical arrangement to the length of the rail section so that vertical compression of the rail produces relative vertical movement between the core 30 and coil 31 and a corresponding change of the inductive effect.

One adaptation of the invention to the measurement of journal friction is shown in FIG. 3 wherein it will be understood that rail sense units of the general type shown in FIG. 2 are employed. This arrangement automatically compensates for unequal wheel diameters.

In FIG. 3, the drag and weight sense units in the form of transistorized displacement oscillators are diagrammatically indicated at 101 and 102, respectively, on rail R and at 101' and 102', respectively, on rail R'. When a wheel pair moves over rail sections R and R', the horizontal drag forces applied to each rail actuate sense units 101 and 101' substantially simultaneously. Similarly, the weight forces actuate sense units 102 and 102' substantially simultaneously.

A mixer 103 having a mean frequency output of 10 mc. is fed from a fixed frequency oscillator 104 and from the drag sense oscillator 101. Similarly, a mixer 103' having a mean frequency output of 10 mc. receives input from a fixed frequency oscillator 104' and from the drag sense oscillator 101'. The mixer 103' and a 3.5 mc. fixed frequency oscillator 105' jointly supply an intermediate mixer 106' operating at a mean frequency range of 13.5 mc. Mixers 103 and 106' feed mixer 107 additively to provide a composite output at a mean frequency range of 23.5 mc. The frequency variations in the composite output of mixer 107 correspond to the total of the drag force on rail R and the drag force on rail R'. Normally, the drag forces act in the same direction and their frequency effects are summed. With wheels of unequal diameter, however, there is a moment acting between the wheel pair which exerts a horizontal force in the positive drag sense on one rail and an opposite horizontal force in the negative drag direction on the other rail. Since the mixer 107 adds positive direction drag forces, it will cause a negative direction drag force to oppose a positive direction drag force and where such positive and negative drag forces are of equal magnitude, they sum to zero in the mixer 107. These forces will cancel out in the mixer 107 and it is important that this be accomplished since these undesired forces can be many times greater than the drag forces which it is desired to measure.

The weight sense unit 102 for rail R feeds a mixer 108 that is also supplied from a 500 kc. fixed frequency oscillator 109. Correspondingly, weight sense unit 102' feeds a mixer 108' which is supplied from a 600 kc. fixed frequency oscillator 109'. An additive mixer 110 receives the 580 kc. output of mixer 108 and the 650 kc. output of mixer 108' and provides a composite output at a frequency of 1230 kc. which represents the composite weight force applied to the two rail sections by the wheel pair.

A mixer 111 receives input in the form of drag intelligence from mixer 112 and weight intelligence from mixer 110 and operates in an additive mode to supply output at 6230 kc. This output is fed to a mixer 113 which is also supplied from a 7230 kc. fixed frequency oscillator 114 to provide normal output at a frequency of 1000 kc. The 1000 kc. output of mixer 113 is fed to a high pass-low pass filter-discriminator 115 arranged to produce negative voltage output for any frequency above 1000 kc. and positive voltage output for any frequency below 1000 kc. Output voltage from the discriminator 115 is normally supplied over a line 115L connected to control a reactance tube oscillator 116 having a nominal range of 28.5 mc. so that the signal fed to mixer 112 from the reactance tube oscillator will be of a frequency to maintain an output frequency at 1000 kc. from mixer 113. Thus, the circuit arrangement is such that, when on standby operation, the reactance tube oscillator 116 responds to output from the discriminator 115 to maintain the input to the discriminator 115 at a frequency of 1000 kc. and thereby compensate for any temperature drift or any strain on the rail due to creepage or ambient temperature effects. This stabilizing control is cut out by means of a wheel gate 117 each time a wheel pair moves over the test section.

It will be understood, therefore, that the output of the filter-discriminator 115 is at a null condition immediately prior to the passage of each wheel pair. Now assuming a wheel pair actuates the drag and weight sense units of each rail section and assuming the weight force applied by each wheel is 6000 pounds and the drag force applied by each wheel is 30 pounds, the additive effect of the drag forces will increase the output frequency of mixer 112 to 5.1 mc. or 5100 kc. and the negative effect of the weight forces will decrease the output frequency of mixer 110 by 100 kc. to a value of 1130 kc. Thus, the output frequency from mixer 111 will remain at 6230 kc. and output from mixer 113 will remain at 1000 kc. Thus, in this example, no output indication is desired as the assumed drag to weight ratio of 10 pounds per ton indicates that journal friction for this wheel pair is at an acceptably low value.

In the previous example, it will be apparent that a drag force of 30 pounds produced a frequency change of 100 kc. whereas a weight force of 6000 pounds was required to produce the corresponding frequency change. Thus, the weight sense facilities operate at a cycle per pound ratio of 200-to-1 as compared with the drag sense facilities. Adjustment of this ratio may be employed for selectively setting the equipment to respond to any desired drag to weight ratio. In the example, a drag to weight ratio of 10 pounds per ton did not actuate the indicating equipment.

The equipment could instead be set so that drag to weight ratios of 5 pounds per ton and less would not actuate the indicating equipment and that higher drag to weight ratios would. In this instance, assuming a drag of 15 pounds and assuming a weight of 6000 pounds the ratio of the weight sensing equipment should then be at a factor of 400-to-1 so that the drag forces will produce a 50 kc. change in frequency and the 6000 pound weight forces will also produce only a 50 kc. change in frequency. In this last-mentioned setup where the 400-to-1 weight factor is employed, if the drag were 30 pounds and the weight were 6000 pounds the change in frequency due to drag would be +100 and the change in frequency due to weight would be —50 kc., leaving a net of +50 kc. at mixers 111 and 113. The equipment for sensing and indicating this net frequency change at mixer 113 is now described.

The output from mixer 113 is also fed to a beat note detector 120 that also receives input from a fixed frequency 1000 kc. oscillator 121 and is arranged to provide a difference frequency that is clipped and shaped to good wave form and constant amplitude. In accordance with the train direction the low frequency tone from the beat note detector 120 is fed either to a differentiator amplifier 122 or a differentiator amplifier 123. Electronic switches 122S and 123S control application of the audio tone to one of the differentiator amplifiers 122 and 123 and they are selectively actuated in accordance with the polarity of the output from the discriminator 115. Thus, assuming an eastbound train provides positive drag forces and produces a +50 kc. frequency increment at the output of mixer 113, the discriminator 115 responds to the +50 kc. frequency increment to produce a negative output that triggers electronic switch 123S and applies the 50 kc. tone from the beat note detector to differentiator 123. Differentiator 123 is in turn connected both to an indicator 124 of any suitable form and to a pen motor unit 125 to provide an output that is proportional to the frequency value.

An alternative journal friction measuring device is illustrated in FIG. 4 wherein rail R is shown equipped with diagonally connected sense units A and B and rail R' is shown equipped with diagonally connected sense units C and D. Each sense unit is again preferably a transistor oscillator incorporating a variable inductance though other forms of sense units may be employed. Sense units A and C produce a resultant increase in frequency when elongated and sense units B and D produce a resultant decrease in frequency when elongated. Thus, a weight load W on rail R shortens sense units A and B producing a decrease in frequency ($-W_A$) at A and a corresponding increase in frequency ($+W_B$) at B. Similarly, a weight force W acting on rail R' produces a decrease in frequency ($-W_C$) at C and an increase in frequency ($+W_D$) at D.

In similar fashion a friction force F acting on rail R as indicated produces a decrease in frequency ($-D_A$) at A and also ($-D_B$) at B and a similar friction force F acting as indicated on rail R' produces a decrease in frequency ($-D_C$) at C and ($-D_D$) at D.

The points of application of these forces are centered so that the reactions of the sense units are equal at this particular time so long as the sense units track linearly. This permits the arrangement to combine the effects of sense units A and B in such a fashion as to provide a total weight force effect $W_1$ for rail R at the output of mixer 205 and to combine these effects in a different fashion so as to provide a total drag force effect $-D_1$ for rail R at the output of mixer 206. Correspondingly, the sense units C and D for rail R' respond to the weight and drag forces thereon and are connected to provide a resultant weight force effect $W_2$ at the output of mixer 205' and a resultant drag force effect $-D_2$ at the output of mixer 206'.

Each of mixers 205 and 205' supplies its weight intelligence to mixer 207 which combines the weight force effects for the two rails in an additive mode to provide an output having a frequency change $W_T$ representative of the total weight applied from the wheel pair to the two rails. Similarly, the drag force effects are combined additively and appear in the output of mixer 208 as a frequency change $-D_T$ to represent the total drag force applied from the wheel pair to the two rails.

Any desired ratio of drag to weight may be responded to by appropriate setting of potentiometer 209. A differentiator detector 210 receives weight information and converts it from frequency form to voltage to apply to one end of the potentiometer 209. Similarly, a differentiator detector 211 receives drag intelligence and converts it from frequency to voltage and applies it to the opposite end of the potentiometer 209.

A normal balanced relationship is maintained in the equipment by means of an FM detector 212 which is responsive to the frequency output from the total drag mixer 208 to supply a voltage to a reactance tube oscillator 213 to maintain its output frequency at a value that insures balance. When a reading is to be made, a change detector 214, triggered by the differentiator detector 210, turns on gate 215 to actuate an electronic switch 216 and connect an indicator 217 for reading the voltage on the potentiometer wiper arm 209A. Simultaneously, the gate 215 disconnects the FM detector 212 to terminate its frequency adjusting action during the interval that a reading is being taken.

In the arrangement disclosed in FIG. 4, the indicator 217 reads directly in terms of drag to weight and additional indicators may be provided for giving direct individual readings of total drag and total weight.

It should be understood that the description of the preferred form of the invention is for the purpose of complying with Section 112, Title 35, of the U.S. Code and that the appended claims should be construed as broadly as the prior art will permit.

What is claimed is:

1. A device for measuring the load applied by a railway car wheel and comprising a rail section arranged to support a railway car wheel and distort directionally in proportion to the load applied therethrough, first and second sense means each mounted to vertically spaced criss-crossed locations on said rail section and each cooperably providing an electrically detectable change proportional to the direction of change of its mounting locations, first and second electrical means connected to said first and second sense means to provide electrical signals proportional to the change of each sense means, an electrical circuit connecting said electrical means to combine the signals algebraically and derive an output signal representative of the ratio of the drag load to the weight load imposed on said rail section by said wheel, and means for utilizing said output signal.

2. A device for measuring the load applied by a railway car wheel and comprising a rail section arranged to support a railway car wheel and distort directionally in proportion to the load applied therethrough, first and second sense means each mounted to vertically spaced criss-crossed locations on said rail section and each cooperably providing an electrically detectable change proportional to the direction of change of its mounting locations, first and second electrical means connected to said first and second sense means to provide electrical signals proportional to the change of each sense means, such that the first electrical means provides a composite drag and weight signal that increases in value upon a elongation of said first sense means and the second electrical means provides a composite drag and weight signal that decreases in value upon elongation of said second sense means, an electrical circuit having a first connection between said first and second electrical means to combine the composite signals additively and provide a sum signal and having a second electrical connection between said first and second electrical means to combine the composite signals subtractively and provide a difference signal and means for receiving and ratioing the sum and difference signals to provide an output signal representative of the ratio of the drag load to the weight load imposed on said rail section by said wheel.

3. A device for measuring the load applied by a railway car through its wheels and comprising a pair of rail sections arranged in spaced apart parallel stationary relationship to cooperably support a wheel pair of a railway car, each rail section having a head, a base, and a vertical web joining the head and base and having a series of vertical slots to facilitate vertical bending of the rail head in response to weight loads and to facilitate horizontal shifting of the rail head in response to drag loads, first and second sense means for each rail section and each mounted to vertically spaced locations on its rail section and cooperably providing an electrically detectable change proportional to the direction of change occurring between its mounting locations, first and second electrical means for each rail section and connected to the first and second sense means of the corresponding rail section to provide electrical signals proportional to the change of each sense means, an electrical circuit connecting all of said electrical means to combine the signals algebraically and derive an output signal representative of the ratio of the sum of the drag loads applied to said rail sections to the sum of the weight loads applied to the rail sections, and means responsive to said electrical circuit for indicating said output signal.

4. A device for measuring the load applied by a railway car through its wheels and comprising a pair of rail sections arranged in spaced apart parallel stationary relationship to cooperably support a wheel pair of a railway car, each rail section having a head and a base connected by a vertical web provided with a series of lengthwise spaced vertical slots to facilitate vertical bending of the rail head in response to weight loads and to facilitate horizontal shifting of the rail head in response to drag loads, a separate first sense unit for each rail section and each mounted to vertically spaced locations on its rail section to respond proportionally to vertical bending of the rail head of such section in response to weight loads, a separate second sense unit for each rail section and each mounted to vertically spaced locations on its rail section to respond proportionally to horizontal shifting of the rail head in response to drag loads, separate electrical means for each sense unit to produce an electrical signal proportional to the change of each sense unit, a first electrical circuit connected to said electrical means to combine the signals therefrom algebraically and provide a composite drag signal representative of the sum of the drag loads applied to said rail sections, a second electrical circuit connected to said electrical means to combine the signals therefrom algebraically and provide a composite weight signal representative of the sum of the weight loads applied to said rail sections, a third electrical circuit connected to said first and second electrical circuits to derive an output signal representative of the ratio of the composite signals, and means for utilizing the output signal.

5. A device for measuring the load applied by a railway car through its wheels and comprising a pair of rail sections arranged in spaced apart parallel stationary relationship to cooperably support a wheel pair of a railway car, each rail section having a head and a base connected by a vertical web provided with a series of lengthwise spaced vertical slots to facilitate vertical bending of the rail head in response to weight loads and to facilitate horizontal shifting of the rail head in response to drag loads, separate first and second sense units for each rail section and each mounted to vertically spaced criss-crossed locations on its rail section to respond proportionally to the direction of change of its mounting locations, separate electrical means for each sense unit to produce an electrical signal proportional to the change of each sense unit, a first electrical circuit connected to said electrical means to combine the signals therefrom algebraically and provide a composite drag signal representative of the sum of the drag loads applied to said rail sections, a second electrical circuit connected to said electrical means to combine the signals therefrom algebraically and provide a composite weight signal representative of the sum of the weight loads applied to said rail sections, a third electrical circuit connected to said first and second electrical circuits to derive an output signal representative of the ratio of the composite signals, and means for utilizing the output signal.

6. A device for measuring the load applied by a railway car through its wheels and comprising a pair of rail sections arranged in spaced apart parallel stationary relationship to cooperably support a wheel pair of a railway car, each rail section having a head and a base connected by a vertical web provided with a series of lengthwise spaced vertical slots to facilitate vertical bending of the rail head in response to weight loads and to facilitate horizontal shifting of the rail head in response to drag loads, a separate first sense unit for each rail section and having one end mounted to the rail base and the other end mounted to the rail head to sense rail distortion changes along a line at an oblique angle to vertical, a second separate sense unit for each rail section and having one end mounted to the rail base at a point underlying the head mounting location of the corresponding first sense unit and having its other end mounted to the rail head at a point overlying the base mounting location of the corresponding first sense unit such that each sense unit responds individually in proportion to both weight load distortion and drag load distortion, separate electrical means for each sense means to produce an electrical signal proportional to the change of each sense means, a first electrical circuit connected to said electrical means to combine the signals therefrom algebraically and provide a composite drag signal representative of the sum of the drag loads applied to said rail sections, a second electrical circuit connected to said electrical means to combine the signals therefrom algebraically and provide a composite weight signal representative of the sum of the weight loads applied to said rail sections, a third electrical circuit connected to said first and second electrical circuits to derive an output signal representative of the ratio of the composite signals, and means for utilizing said output signal.

7. A device for measuring the load applied by a railway car through its wheels and comprising a pair of rail sections arranged in spaced apart parallel stationary relationship to cooperably support a wheel pair of a railway car, each rail section having a head and a base connected by a vertical web provided with a series of lengthwise spaced vertical slots to facilitate vertical bending of the rail head in response to weight loads and to facilitate horizontal shifting of the rail head in response to drag loads, each rail section having a set of two mounting points on its head and a set of two mounting points on its base all collectively defining a substantially rectangular array, a first sense unit having opposite ends connected to diagonally spaced ones of said points to respond proportionally to changes in the spacing between said points, a second sense unit connected to the remaining ones of said points to respond proportionally to changes in the spacing thereof, first electrical means for said first sense means for producing an electrical signal increasing in proportion to increasing change in the spacing of its mounting points, second electrical means for said second sense unit to produce an electrical signal decreasing in proportion to increasing change in the spacing of its mounting points, a separate first electrical circuit connected to the first and second electrical means for one rail section to produce sum and difference signals representative of the drag and weight forces, applied to such rail section, separate second electrical circuit means connected to the first and second electrical means corresponding to the other rail section and responsive to produce sum and difference signals representative of the drag and weight forces respectively applied to such rail section, a third electrical circuit connected to add said sum signals algebraically, a fourth electrical circuit connected to add said difference signals algebraically, and means connected to receive and ratio the added signals in said third and fourth electrical circuits to provide an output signal representative of the ratio of the total drag forces to the total weight forces.

8. A device for measuring the load applied by a railway car wheel and comprising a rail section arranged to support a railway car wheel and distort directionally in proportion to the load applied therethrough, first and second sense means each mounted to vertically spaced criss-crossed locations on said rail section and each cooperably providing an electrically detectable change proportional to the direction of change of its mounting locations, first electrical means connected to said first sense means to provide an electrical signal having a frequency value proportional to the change of said first sense means, second electrical means connected to said second sense means to provide an electrical signal having a frequency value proportional to the change of said second sense means, a first mixer connected to said first and second electrical means for deriving an output signal having a frequency value representative of the drag load applied to the rail section, a second mixer connected to said first and second electrical means for deriving an output signal having a frequency value representative of the weight load applied to the rail section, ratio means combining said output signals in opposition in accordance with a predetermined ratio of drag to weight, and indicating means responsive to said ratio means.

9. A device for measuring the load applied by a railway car through its wheels and comprising a pair of rail sections arranged in spaced apart parallel stationary relationship to cooperably support a wheel pair of a railway car, each rail section being distortable directionally in proportion to the applied load, first and second sense means for each rail section and each mounted to vertically spaced locations on its rail section and cooperably providing an electrically detectable change proportional to the direction of change occurring between its mounting locations, first and second electrical means for each rail section and connected to the first and second sense means of the corresponding rail section, to each provide an electrical signal having a frequency value proportional to the change of each sense means, means including first and second mixers connected to said first and second electrical means for deriving a first output signal having a frequency value representative of the drag load applied to the rail section and a second output representative of the weight load applied to the rail section, ratio means combining said output signals in opposition in accordance with a predetermined ratio of drag to weight, and indicating means responsive to said ratio means.

10. A device for measuring the load applied by a railway car through its wheels and comprising a pair of rail sections arranged in spaced apart parallel stationary relationship to cooperably support a wheel pair of a railway car, each rail section being distorable directionally in proportion to the applied load, first and second sense means for each rail section and each mounted to vertically spaced locations on its rail section and cooperably providing an electrically detectable change proportional to the direction of change occurring between its mounting locations, first and second electrical means for each rail section and connected to the first and second sense means of the corresponding rail section, to each provide an electrical signal having a frequency value proportional to the change of each sense means, means including first and second mixers connected to said first and second electrical means for deriving a first output signal having a frequency value representative of the drag load applied to the rail section and a second output representative of the weight load applied to the rail section, a mixer connected to receive said output signals and provide a composite signal having a frequency value representative of the ratio of the drag load to the weight load, a discriminator and a beat note detector each connected to the last named mixer an electronic switch connecting output from said discriminator to an indicator, and means connecting the beat note detector to the electronic switch to control the same.

11. A device for measuring the load applied by a railway car through its wheels and comprising a pair of rail sections arranged in spaced apart parallel stationary relationship to cooperably support a wheel pair of a railway car, each rail section having a head and a base connected by a vertical web provided with a series of lengthwise spaced vertical slots to facilitate vertical bending of the rail head in response to weight loads and to facilitate horizontal shifting of the rail head in response to drag loads, a separate first sense unit for each rail section and each mounted to vertically spaced locations on its rail section to respond proportionally to vertical bending of the rail head of such section in response to weight loads, a separate second sense unit for each rail section and each mounted to vertically spaced locations on its rail section to respond proportionally to horizontal shifting of the rail head in response to drag loads, separate electrical means for each sense unit to produce an electrical signal each having a frequency value proportional to the change of the corresponding sense unit, a first mixer connected to said electrical means for deriving an output signal representative of the drag loads applied to said rail sections, a second mixer connected to said electrical means for deriving an output signal representative of the weight loads applied to said rail sections, a third mixer combining the output signals in opposition in accordance with a predetermined ratio of drag to weight to provide a composite output signal, a high-pass low-pass discriminator and a beat note detector each connected to said third mixer to receive said composite output signal and respond selectively in accordance with the frequency value thereof, means connected from said discriminator to said first mixer to maintain the frequency thereof at a predetermined reference value betwen successive actuations of said device an indicator, and electronic switch means connected to said beat note detector and selectively connecting output from said discriminator to said indicator in accordance with the direction of train wheel movement.

12. A device for measuring the load applied by a railway car wheel and comprising a rail section arranged to support a railway car wheel and distort directionally in proportion to the load applied therethrough, first and second sense means each mounted to vertically spaced criss-crossed locations on said rail section and each cooperably providing an electrically detectable change proportional to the direction of change of its mounting locations, first electrical means connected to said first sense means to provide an electrical signal having a frequency value proportional to the change of said first sense means, second electrical means connected to said second means to provide an electrical signal having a frequency value proportional to the change of said second means, a mixer connected to said first and second electrical means for deriving an output signal having a frequency value representative of the weight load applied to the rail section, and utilization means connected to receive said output signal.

13. A device for measuring the load applied by a railway car wheel and comprising a rail section arranged to support a railway car wheel and distort directionally in proportion to the load applied therethrough, first and second sense means each mounted to vertically spaced criss-crossed locations on said rail section and each cooperably providing an electrically detectable change proportional to the direction of change of its mounting locations, first electrical means connected to said first sense means to provide an electrical signal having a frequency value proportional to the change of said first sense means, second electrical means connected to said second sense means to provide an electrical signal having a frequency value proportional to the change of said second means, a mixer connected to said first and second electrical means for deriving an output signal having a frequency value representative of the drag load applied to the rail section, and utilization means connected to receive said output signal.

14. A device for measuring the load applied by a railway car through its wheels and comprising a pair of rail sections arranged in spaced apart parallel stationary relationship to cooperably support a wheel pair of a railway car, each rail section being distortable directionally in proportion to the applied load, first and second sense means for each rail section and each mounted to vertically spaced locations on its rail section and cooperably providing an electrically detectable change proportional to the direction of change occurring between its mounting locations, first and second electrical means for each rail section and connected to the first and second sense means of the corresponding rail section, to each provide an electrical signal having a frequency value proportional to the change of each sense means, means including a mixer connected to said first and second electrical means for deriving a first output signal having a frequency value representative of the weight load applied to the rail section and utilization means connected to receive said output signal.

15. A device for measuring the load applied by a railway car through its wheels and comprising a pair of rail sections arranged in spaced apart parallel stationary relationship to cooperably support a wheel pair of a railway car, each rail section being distortable directionally in proportion to the applied load, first and second sense means for each rail section and each mounted to vertically spaced locations on its rail section and cooperably providing an electrically detectable change proportional to the direction of change occurring between its mounting locations, first and second electrical means for each rail section and connected to the first and second sense means of the corresponding rail section, to each provide an electrical signal having a frequency value proportional to the change of each sense means, means including a mixer connected to said first and second electrical means for deriving a first output signal having a frequency value representative of the drag load applied to the rail section and utilization means connected to receive said output signal.

16. A device for measuring the load applied by a railway car through its wheels and comprising a pair of rail sections arranged in spaced apart parallel stationary relationship to cooperably support a wheel pair of a railway car, each rail section being distortable directionally in proportion to the applied load, first and second sense means for each rail section and each mounted to vertically spaced locations on its rail section and cooperably providing an electrically detectable change proportional to the direction of change occurring between its mounting locations, first and second electrical means for each rail section and connected to the first and second sense means of the corresponding rail section, to each provide an electrical signal having a frequency value proportional to the change of each sense means, means including a mixer connected to said first and second electrical means for deriving a first output signal having a frequency value representative of the weight load applied to the rail section and utilization means connected to receive said output signal and including a discriminator and a beat note detector each connected to respond to changes in the frequency of the output signal, an electronic switch connecting output from said discriminator to an indicator, and means connecting the beat note detector to the electronic switch to control the same.

References Cited by the Examiner

UNITED STATES PATENTS 3,009,056 11/1961 Boone et al. _____ 177—211 X
3,116,044 12/1963 Stanley _____ 73—9 X LOUIS R. PRINCE, *Primary Examiner.*

DAVID SCHONBERG, RICHARD QUEISSER,
*Examiners.*